(12) United States Patent
Tan et al.

(10) Patent No.: US 11,602,153 B2
(45) Date of Patent: Mar. 14, 2023

(54) COLLOIDAL STABILIZER EFFECTIVE AT LOW CONCENTRATIONS

(71) Applicant: DUPONT NUTRITION USA, INC., Wilmington, DE (US)

(72) Inventors: Zheng Tan, Ewing, NJ (US); Mei Yan Joyce Toh, Langhorne, PA (US); Simon Patrick Charles Eustace, Lincoln University, PA (US); Jeremy Ondov, New York, NY (US)

(73) Assignee: DUPONT NUTRITION USA, INC., Wilmington, DE (US)

( * ) Notice: Subject to any disclaimer, the term of this patent is extended or adjusted under 35 U.S.C. 154(b) by 96 days.

(21) Appl. No.: 16/323,415

(22) PCT Filed: Aug. 11, 2017

(86) PCT No.: PCT/US2017/046441
§ 371 (c)(1),
(2) Date: Feb. 5, 2019

(87) PCT Pub. No.: WO2018/031859
PCT Pub. Date: Feb. 15, 2018

(65) Prior Publication Data
US 2019/0174785 A1  Jun. 13, 2019

Related U.S. Application Data

(60) Provisional application No. 62/374,524, filed on Aug. 12, 2016.

(51) Int. Cl.
| | |
|---|---|
| A23C 9/154 | (2006.01) |
| C08L 1/04 | (2006.01) |
| A23L 29/262 | (2016.01) |
| A23L 2/52 | (2006.01) |
| A23C 9/137 | (2006.01) |

(52) U.S. Cl.
CPC ............. *A23C 9/154* (2013.01); *A23C 9/137* (2013.01); *A23L 2/52* (2013.01); *A23L 29/262* (2016.08); *C08L 1/04* (2013.01); *A23V 2002/00* (2013.01); *C08L 2205/025* (2013.01); *C08L 2205/03* (2013.01)

(58) Field of Classification Search
CPC . A23L 29/262; A23L 2/52; C08L 1/04; C08L 1/286; C08L 2205/025; C08L 2205/03; A23C 9/137; A23C 9/154; A23V 2002/00

USPC ......................................................... 426/593
See application file for complete search history.

(56) References Cited

U.S. PATENT DOCUMENTS

| | | |
|---|---|---|
| 8,801,847 B2 | 8/2014 | Tuason |
| 2013/0090391 A1* | 4/2013 | Tan ........................ A61K 8/022 514/781 |
| 2013/0150462 A1 | 6/2013 | Tan et al. |
| 2014/0171521 A1 | 6/2014 | Enatsu et al. |
| 2014/0212563 A1 | 7/2014 | Bache et al. |
| 2014/0370180 A1* | 12/2014 | Tan ........................ C08L 1/286 426/580 |

FOREIGN PATENT DOCUMENTS

WO    WO 2018/031859 A1    2/2018

OTHER PUBLICATIONS

European Search Report for International Application No. PCT/US2017/046441, International Filing Date Aug. 11, 2017.
International Preliminary Report on Patentability, International Filing Date PCT/US2017/046441, International Filing Date Aug. 11, 2017.
Written Opinion of the International Searching Authority, International Filing Date PCT/US2017/046441, International Filing Date Aug. 11, 2017.
International Search Report, International Filing Date PCT/US2017/046441, International Filing Date Aug. 11, 2017.

* cited by examiner

*Primary Examiner* — Subbalakshmi Prakash

(57) ABSTRACT

This invention relates to making and using a stabilizer that is effective in small amounts and, particularly useful for stabilizing low solids liquids, e.g., dispersions, emulsions, and suspensions, used in foods, pharmaceuticals, nutraceuticals, and similar industrial applications, which comprises, microcrystalline cellulose, (preferably, colloidal hydrolyzed MCC); a first carboxymethyl cellulose having a viscosity of 30-85 cP at 2% in deionized water; and, a degree of carboxymethyl substitutions of 0.60 to 0.85, and a second carboxymethyl cellulose having a viscosity of 400-800 cP at 2% in deionized water, and a degree of carboxymethyl substitutions of 0.80 to 0.95; and, the stabilizer may be made by preparing a moist MCC "wetcake"; thoroughly mixing the wetcake with a dry blended mixture of low DS and medium DS, CMCs; preferably, in a MCC/low DS CMC/medium DS CMC ratio range of about 88/6/6 to about 92/4/4, adding that mixture to an extruder; preparing a slurry of the extrudate in deionized water; and, optionally, pumping the slurry to a spray dryer to produce a powder.

18 Claims, No Drawings

COLLOIDAL STABILIZER EFFECTIVE AT LOW CONCENTRATIONS

FIELD OF INVENTION

This invention relates to making and using a stabilizer for food, pharmaceutical, nutraceutical, and other products, which comprises; microcrystalline cellulose (MCC) and two types of carboxymethyl cellulose CMC, one having a low degree of substitution and the other having a medium degree of substitution.

BACKGROUND OF THE INVENTION

A stabilizer for formulating food, pharmaceutical, nutraceutical, and industrial, products is required to perform one or more functions depending on the structure of the stabilizer and on its application. The main function of a stabilizer is preventing separation of the components in a formulation. Other stabilizer functions include, for example, gelling, thickening, suspending, texturizing, and/or improving mouthfeel. Colloidal hydrolyzed microcrystalline cellulose (colloidal MCC) has been successfully used as a stabilizer since Durand et al. (U.S. Pat. No. 3,539,365) discovered coating attrited microcrystalline cellulose (MCC) with carboxymethyl cellulose (CMC) as a barrier material.

The first commercial colloidal MCC product, Avicel® CL611 MCC (made by FMC Corporation, Philadelphia, USA), was made with carboxymethyl cellulose having a low degree of substitution (U.S. Pat. No. 3,539,365, and see also US Pat. Application 2013/0090391 A1). The carboxymethyl cellulose is a cellulose derivative having carboxymethyl groups bound to some of the hydroxyl groups of the anhydroglucose units that make-up the cellulose backbone. The degree of substitution (DS) represents the average number of hydroxyl groups substituted per anhydroglucose unit. Each anhydroglucose unit contains three hydroxyl groups, which gives CMC a maximum theoretical DS of 3.0. A typical commercial grade CMC has a degree of substitution representing the average number of carboxymethyl groups per anhydroglucose unit of, for example, a DS of 0.7, which is an average of 7 carboxyl groups per 10 anhydroglucose units. In addition, commercial CMCs are specified by their viscosities to characterize their molecular weight. Avicel® CL611 MCC performs a stabilizing function in beverages; but, usually requires high concentrations, e.g., >0.6% of total beverage weight; and, many other MCC products require ~0.4% of the total beverage weight to be effective. Avicel® RC591 MCC (also made by FMC Corporation), comprises a medium viscosity/low DS CMC (US Pat. Application 2013/0090391 A1). This product is an effective stabilizer at lower concentrations than Avicel® CL611 MCC, in many applications. At higher concentrations Avicel® RC591 MCC can cause undesirable gelation in beverages, leading to a narrow effective concentration spread which is defined as the difference between the lowest amount needed to suspend particles and the level that causes gelation. Other attempts have been made in the past to improve the colloidal microcrystalline cellulose based stabilizing agents. For an example, Tuason et al. (U.S. Pat. No. 7,879,382) successfully created a colloidal MCC with CMC at the degree of substitution of 0.9-1.5. From our tests as shown below in the examples, the colloidal MCC fails in low solids aqueous systems at a concentration of <0.45% wt. and in Ultra-High Temperature (UHT) dairy chocolate milk at a concentration of <0.2%. Bache and Ungerer in their patent applications (US Pub. No. 2013/0064953 A1 and US Pub. No. 2014/0212563 A1) disclose a material made with a combination of MCC and two types of CMC having DS=0.6-0.9 and DS=1.1-1.45, that also fails by sedimentation at a concentration of <0.2% wt. in UHT dairy chocolate milk and by gelation at a concentration of >0.4% wt. in our low solids aqueous systems.

SUMMARY OF THE INVENTION

The current invention provides compositions that include microcrystalline cellulose and two types of carboxymethyl cellulose, one of which has the degree of substitution of 0.60-0.85 (low DS CMC) and other has the degree of substitution of 0.80-0.95 (medium DS CMC). The low DS CMC has a viscosity of 30-85 cP at 2% wt. in deionized water, measured with a Brookfield at 60 rpm. The medium DS CMC has viscosity of 400-800 cP at 2% wt. in deionized water, measured with a Brookfield at 30 rpm.

In a method of preparing the stabilizer of this invention, a moist microcrystalline cellulose ("wetcake") is thoroughly blended with a dry blend of the low and medium DS CMCs, before that admixture is charged into a Readco extruder for co-attrition. The extrudate is then slurried in deionized water before pumping to a spray dryer for producing the stabilizer in powder form.

It has been found that a good co-attrition of MCC/CMCs may be reached when medium DS CMC is not more than 8% of total admixture weight. Acceptable co-attrition was obtained at MCC/low DS CMC/medium DS CMC=88/6/6, as well as 92/4/4 and 90/5/5.

A beverage including the stabilizer of the present invention can additionally comprise diverse edible materials and additives, including, e.g., proteins, crushed seeds, and mineral particles.

In one embodiment the present invention provides a colloidal MCC stabilizer, comprising:
  i) hydrolyzed colloidal microcrystalline cellulose;
  ii) Low DS carboxymethyl cellulose having a viscosity of 30-85 cP in 2% deionized water and a DS of about 0.60 to about 0.85; and,
  iii) Medium DS carboxymethyl cellulose having a viscosity of 400-800 cP in 2% deionized water and a DS of about 0.80 to about 0.95.

In another embodiment the present invention provides a colloidal MCC stabilizer as set forth above, wherein the weight ratio of microcrystalline cellulose/low DS carboxymethyl cellulose/medium DS carboxymethyl cellulose is selected from the group consisting of 92/4/4, 90/5/5, and 88/6/6; the carboxymethyl celluloses may be their sodium, ammonia or potassium salt form; and/or the low DS carboxymethyl cellulose may be commercial type 7 and the medium DS carboxymethyl cellulose may be commercial type 9.

In another embodiment of the present invention the stabilizer the medium DS carboxymethyl cellulose is in an amount not more than 8% wt.

In yet another embodiment of the present invention the weight ratio of the microcrystalline cellulose to the sum of the low and medium DS carboxymethyl celluloses is about 88:12 to 92:8. Low DS CMC and medium DS CMC comprise 8 to 12% wt. of the stabilizer.

In yet another embodiment of the present invention is a beverage product including an embodiment of the stabilizer, as set forth above, selected from the group consisting of: cocoa in a chocolate dairy milk beverage; finely ground almond in an almond beverage; insoluble calcium salts in fortified calcium milk; and, cocoa in a chocolate soy beverage, and milk products, for example, Pasteurized milk including HTST, LTLT and ESL milk; Retort milk; UHT milk; Full Cream milk; Hi-Calcium milk, Milk tea; Milk coffee; Mineral-fortified milk; Reduced Fat milk; Low Fat milk; and; Flavored milk; Vanilla-flavored Milk, Mocca-flavored Milk, Melon-flavored milk, Strawberry-flavored milk; and, Chocolate-flavored milk.

Other embodiments of the present invention include Plant Protein beverages including a stabilizer, as set forth above, for example, Almond Milk; Cashew Milk; Soy Milk; Peanut Milk; Coconut Milk; and; Walnut Milk.

The beverage embodiments of the present invention described above typically include the stabilizer in the amount of 0.05% wt. to 3.5% wt. of total product; and, in some embodiments 0.2% wt. to 2.0% by wt. of total product.

The present invention provides a method for preparing a stabilizer, comprising the steps of:

i) preparing a moist wetcake of hydrolyzed colloidal microcrystalline cellulose;

ii) Preparing a dry blend of low DS carboxymethyl cellulose having a viscosity of 30-85 cP in 2% deionized water and a DS of about 0.60 to about 0.85, with a medium DS carboxymethyl cellulose having a viscosity of 400-800 cP in 2% deionized water and a DS of about 0.80 to about 0.95;

iii) blending the wetcake i) with the dry blend ii);

iv) co-attriting the blend iii) and, optionally, the step of spray drying the co-attrited blend iv) to form a powder. Optionally, the co-attrition step iii) is performed in an extruder.

In one embodiment of the method of the present invention the wetcake may comprise about 38 to about 60% wt. water.

Other features and advantages of the foregoing embodiments will be apparent from the following detailed description, and from the claims. The forgoing general description and detailed description of certain embodiments are exemplary and explanatory only and are not intended to limit the present invention or scope of the claims

DETAILED DESCRIPTION OF THE INVENTION

The microcrystalline cellulose employed in preparing the compositions of this invention may be in the form of hydrolyzed cellulose wetcake.

MCC from any source may be used to make this invention. Suitable feedstocks from which MCC may be obtained include, for example, wood pulp (such as bleached sulfite and sulfate pulps), corn husks, bagasse, straw, cotton, cotton linters, flax, hemp, ramie, seaweed, cellulose, and fermented cellulose. Additional feedstocks include bleached softwood Kraft pulps, bleached hardwood Kraft pulps, bleached *Eucalyptus* Kraft pulps, paper pulps, fluff pulps, dissolving pulps, and bleached non-wood cellulosic pulps. In one embodiment, the MCC used is one approved for human consumption by the United States Food and Drug Administration.

MCC is particularly, useful for suspending particles such as cocoa in a chocolate dairy beverage, finely ground almond in an almond beverage, insoluble calcium salts in a fortified calcium milk, and cocoa in a chocolate soy beverage, and has many other applications. Other suitable milk beverages include dairy or plant milk (Pastuerized, Retort, UHT type); dairy milk (such as Full cream, Hi-Calcium, Reduced Fat, Low Fat, Strawberry, Chocolate or other flavored milk); plant protein milk (such as Almond, Soy, Peanut, Coconut, Walnut milk or a mixture of plant protein milk); and plant protein milk (Flavored).

MCC may be made from a low cost pulp or mixtures of low cost pulp and specialty pulp. If a mixture is desired, then, for example, 30-80% of the total MCC can be made from low cost pulp, and the colloidal content of the resulting MCC product can be at least 60%. Examples of low cost pulp include any paper grade pulp and fluff pulp, such as Southern Bleached Softwood Kraft Pulp, Northern Bleached Softwood Pulp, Bleached *Eucalyptus* Kraft Pulp, Bleached Hardwood Kraft Pulp, Bleached Sulfite Pulps, Bleached Soda Pulps, and bleached non-wood pulps. Specific low cost pulps include CPH pulp from Weyerhaeuser and Viscose grade dissolving pulps.

CMCs may be in sodium, ammonia, or potassium salt form. Low degree of substitution CMC (Low DS CMC) has a degree of substitution of about 0.60 to about 0.85. Medium degree of substitution CMC (Medium DS CMC) has a degree of substitution of about 0.8 to about 0.95. Due to natural sources of cellulose and processes used in its chemical modifications, a spread of DSs has been specified by CMC manufactures on various types of CMCs. There are commonly three types of CMCs in use, 7 (low), 9 (medium) and 12 (high), see, for example, on page no. 6 of Aqualon™ sodium carboxymethyl cellulose booklet available from Ashland, Inc.

To achieve desirable properties, a skilled person may apply intense mechanical shearing, such as, for non-limiting example, refining, homogenizing, milling, mixing, kneading grinding and/or extruding of microcrystalline cellulose slurry or moist mixture thereof (also known as "wetcake" in this disclosure) using for non-limiting example, extruders, refiners, mixers, colloid mills, beat mills, kneaders and grinders. The resulting shear forces may cause particle size reduction and, when at least some, if not all or most of the particles are reduced to colloidal size, particle separation may occur. Upon drying the individual particles tend to agglomerate or hornify. Re-dispersing the agglomerated or hornified dry powder will cause it to lose its desirable properties. To prevent hornification of the particles, a protective material such as CMC may be added to MCC particles during the mechanical shearing. The term "at least partially colloidal" as used herein, means that at least 1% of the particles are colloidal, i.e., have a length of 1 micron, or less, by electron microscopic examination, unless otherwise expressly stated. The percentage of colloidal content will vary depending on the intended product application. Final products of the present invention may have a total colloid content of about 80-85% colloidal particle content.

One effective way to accomplish co-shearing or co-processing MCC with CMC is shearing in an extruder. The MCC wetcake, typically in a range of about 38% wt. to about 60% wt. of solid is pre-mixed with CMC powders before it is charged into the extruder. The moist mixture is extruded with sufficient intensity to achieve co-attrition and interaction. As used in this specification, the terms "attrited" and "attrition" are used interchangeably to mean a process that effectively reduces the size of at least some if not all of the particles to a colloidal size. "Co-attrition" refers to application of high shear forces to an admixture of the MCC and CMC components.

The extrudate can be dried or be dispersed in water to form slurry. The slurry can be further homogenized before drying or directly dried. Drying methods include fluidized bed drying, drum drying, bulk drying, flash drying and spray drying. Dried powders or flakes can be reconstituted in aqueous medium or other medium to form a composition, for example, beverage, edible food, pharmaceutical, nutraceutical, or industrial, product, as described herein.

In accordance with the present invention the MCC, low DS CMC and medium DS CMC mixture is extruded at high intensity with high shear and high compression, so that the resulting colloidal MCC product is sufficiently attrited. As used herein, "shear force" refers to an action resulting from applied force that causes or tends to cause two contiguous parts of a mixture to slide relative to each other in a direction generally parallel to their plane of contact. The amount of force applied should be sufficient to create associations between the microcrystalline cellulose and the carboxymethyl cellulose. If the force applied is insufficient, the components remain too "slippery," to transfer the shear force applied to the material or admixture, to accomplish intimate associations. In that case, the shear force is primarily dissipated as mechanical energy by the sliding action. Any means to increase the extrusion intensity may be used, including, but not limited to, extruder designs, duration/passes of extrusions, and extrusion with attrition aids, including all mentioned by FMC patent U.S. Pat. No. 6,037,380 (Venables et al.) and high shear and/or high solids levels.

The quantities of MCC, and the mixture of CMCs, are such that the weight ratio of MCC to CMCs is about 88:12 to about 92:8. Generally, a good co-attrition of MCC/CMCs may be reached when medium DS CMC has not more than 8% wt. of total admixture weight. Acceptable co-attrition was obtained at MCC/low DS CMC/medium DS CMC=88/6/6, as well as 90/4/4, and 90/5/5.

As noted above, the stabilizers of this invention are suitable for a wide variety of food, pharmaceutical, nutraceutical and industrial applications including in cosmetic products, personal care products, consumer products, agricultural products, or in chemical formulations and in paint, polymer formulations.

Some examples in pharmaceutical applications include liquid suspending agents and/or emulsions for drugs; nasal sprays for drug delivery where the MCC/CMC gives increased residence and bioavailability; controlled release agents in pharmaceutical applications; and re-constitutable powders which are dry powders mixtures containing drugs which can be made into a suspension by adding water and shaking by-hand; topical drug applications, and various foams, creams, lotions for medical uses, including compositions for oral care such as toothpaste, mouthwash and the like. One particular example is a suspension of benzoyl peroxide or similar agents, which requires the stability of the MCC/CMC against oxidizing agent over time. Other examples include pharmaceutical suspensions (or re-constitutable powders) which are acidic or with high ionic strength.

Some examples in nutraceutical applications include delivery systems for various nutraceutical ingredients and dietary supplements. Examples in industrial applications include various suspensions, thickeners, which can be used in foams, creams, lotions and sun-screens for personal care applications; suspending agents, which can be used with pigments and fillers in ceramics, or used in colorants, optical brighteners, cosmetics, and oral care in products such as toothpaste, mouthwash and the like; materials such as ceramics; delivery systems for pesticides including insecticides; delivery of herbicides, fungicides, and other agricultural products, and paints, and various chemical or polymer suspensions. One particular example is an industrial wash fluid, containing oxidizing or bleach agents, which demand strong and stable suspension systems.

The stabilizer of the present invention may be used in a variety of food products including emulsions, beverages, sauces, soups, syrups, dressings, films, dairy and non-dairy milks and products, frozen desserts, cultured foods, bakery fillings, and bakery cream. It may also be used for the delivery of flavoring agents and coloring agents. The edible food products can additionally comprise diverse edible material and additives, including proteins, fruit or vegetable juices, fruit or vegetable pulps, fruit-flavored substances, or any combination thereof.

These food products can also include other edible ingredients such as, for example, mineral salts, protein sources, acidulants, sweeteners, buffering agents, pH modifiers, stabilizing salts, or a combination thereof. Those skilled in the art will recognize that any number of other edible components may also be added, for example, additional flavorings, colorings, preservatives, pH buffers, nutritional supplements, process aids, and the like. The additional edible ingredients can be soluble or insoluble, and, if insoluble, can be suspended in the food product. Routine adjustment of the composition is fully within the capabilities of one having skill in the art and is within the scope and intent of the present invention. These edible food products can be dry mix products (instant sauces, gravies, soups, instant cocoa drinks, etc.), low pH dairy systems (sour cream/yogurt, yogurt drinks, stabilized frozen yogurt, etc.), baked goods, and as a bulking agent in non-aqueous food systems and in low moisture food systems.

Juices suitable for incorporating the stabilizer composition include fruit juices (including but not limited to lemon juice, lime juice, and orange juice, including variations such as lemonade, limeade, or orangeade, white and red grape juices, grapefruit juice, apple juice, pear juice, cranberry juice, blueberry juice, raspberry juice, cherry juice, pineapple juice, pomegranate juice, mango juice, apricot juice or nectar, strawberry juice, and kiwi juice) and vegetable juices (including but not limited to tomato juice, carrot juice, celery juice, beet juice, parsley juice, spinach juice, and lettuce juice). The juices may be in any form, including liquid, solid, or semi-solid forms such as gels or other concentrates, ices or sorbets, or powders, and may also contain suspended solids. In another embodiment, fruit-flavored or other sweetened substances, including naturally flavored, artificially flavored, or those With Other Natural Flavors ("WONF"), may be used instead of fruit juice. Such fruit flavored substances may also be in the form of liquids, solids, or semi-solids, such as powders, gels or other concentrates, ices, or sorbets, and may also contain suspended solids.

Proteins suitable for the edible food products incorporating the stabilizer compositions include food proteins and amino acids, which can be beneficial to mammals, birds, reptiles, and fish. Food proteins include animal or plant proteins and fractions or derivatives thereof. Animal derived proteins include milk and milk derived products, such as heavy cream, light cream, whole milk, low fat milk, skim milk, fortified milk including protein fortified milk, processed milk and milk products including superheated and/or condensed, sweetened or unsweetened skin milk or whole milk, dried milk powders including whole milk powder and Nonfat Dry Milk (NFDM), casein and caseinates, whey and whey derived products such as whey concentrate, delactosed whey, demineralized whey, whey protein isolate. Egg and egg-derived proteins may also be used. Plant derived proteins include nut and nut derived proteins, sorghum, legume and legume derived proteins such as soy and soy derived products such as untreated fresh soy, fluid soy, soy concentrate, soy isolate, soy flour, and rice proteins, and all forms and fractions thereof. Food proteins may be used in any available form, including liquid, condensed, or powdered.

When using a powdered protein source, however, it may be desirable to pre-hydrate the protein source prior to blending with stabilizer compositions and juice for added stability of the resulting beverage. When protein is added in conjunction with a fruit or vegetable juice, the amount used will depend upon the desired end result.

It should also be noted that the food/beverage compositions may be processed by heat treatment in any number of ways. These methods may include, but are not limited to, Low Temperature Long Time (LTLT), High Temperature Short Time (HTST), Ultra-High Temperature (UHT) and Extended Shelf Life (ESL) processes. These beverage compositions may also be retort processed, either by rotary retort or static retort processing. Some compositions, such as juice-added or natural or artificially flavored soft drinks may also be cold processed. Many of these processes may also incorporate homogenization or other high shear/high compression methods. There may also be co-dried compositions, which can be prepared in dry-mix form, and then conveniently reconstituted for consumption as needed. The resulting beverage compositions may be refrigerated and stored for a commercially acceptable period of time. In the alternative, the resulting beverages may be stored at room temperature, provided they are filled under aseptic conditions.

The described compositions can act as stabilizers are suitable for use in the beverage industry. The compositions, after drying to powder form, can be mixed with an aqueous solution to form a colloidal mixture that, in some embodiments, can maintain its colloidal properties for a long period of time. Some of the edible food products are beverages, protein and nutritional beverages, mineral fortified beverages, dairy-based beverages, and non-dairy based beverages including, but not limited to, those that are heat treated, for example, by pasteurization, ultra-pasteurization, or retort processes. The typical concentrations of the stabilizer of the present invention used in the above beverage products can range from 0.05% to about 3.5% by wt. of total products, and in some instances 0.2 to 2.0% by wt. of total products.

In the following examples, unless other tests are specified, dry powders of the compositions are evaluated by:
1. Weigh and disperse 15.6 grams powder into 584.4 grams deionized (2.6% solid) in a standard size borosilicate glass jar with capacity of 1250 mL equipped with a standard size cutting blade of 2.25 inch in overall diameter at widest point on a Waring blender;
2. Agitate the dispersion at the highest rotation speed for 2 minutes;
3. Within 30 seconds a viscosity measurement is performed on a Brookfield RV viscometer with an appropriate spindle (#1, #2, #3, #4, or #5) at room temperature, the viscosity is termed as initial viscosity;
4. Set the dispersion on a laboratory bench for 24 hours;
5. A viscosity measurement is performed on a Brookfield RV viscometer with an appropriate spindle (#1, #2, #3, #4, or #5) at room temperature, the viscosity is termed as set-up viscosity; and,
6. After 24-hour set-up, the dispersion is also submitted for a gel strength and thixotropy test on a TA Instruments ARES-RFS 3 rheometer using a 50 mm in diameter parallel-plate geometry at a 1.8 mm gap. The tests are performed at 20° C.

The gel strength (G') is obtained at a shear strain of 1% from a dynamic strain ramp test with the strains of from 0.1 to 100% at 1 Hz of frequency. The thixotropy test is conducted following 5 minutes equilibration before a shear rate sweep 0-50-0 sec-1 with 5 minutes up and 5 minutes down.

EXAMPLES

The following examples are intended to be illustrative of the preparation and use of the MCC/CMCs stabilizing agents, but are not to be construed as limiting their utility or scope of the invention.

Examples 1-8

Table 3 shows 7 examples of laboratory-produced samples for comparison to the invention. Microcrystalline cellulose wetcake has 41.52% of total solid. Weigh exact amounts of all ingredients to the desired dry weight ratio of MCC/low DS CMC/medium DS CMC and to 600 grams of total dry weight. Mixing of all ingredients was conducted in a Hobart A120 mixer (Model No. ML 38904) with the wetcake in a 12 quart bowl. The MCC wetcake was first loaded in the Hobart mixer bowl. The beater/paddle was then assembled to rotate at lowest setting. Two types of CMCs were mixed thoroughly in a separate small container before being added to the mixer. The beater/paddle rotation speed is progressively increased to the highest setting until visually uniform admixture is observed. The mixed admixture was fed into a Readco 2 inch extruder from Readco Kurimoto, LLC. Three passes were conducted. The extrusion performance can be monitored through reading the torque at an attached amperage meter. Another way to check the effectiveness of the attrition is to measure the temperature of extrudate. The higher the amperage meter reading is and the hotter the extrudate is, the more effective the attrition is. All extrudate samples taken from the extrusion process were slurried with deionized water before being dried into powders using a Stork-Bowen 3' spray drier with an atomizing nozzle, a heating temperature of 225° C., and collecting temperature of 120° C.-130° C. Selected samples, typically those samples which had positive extrusion performance, were tested in a pasteurized chocolate milk beverage for storage stability (milk evaluation) with the beverage formulation as shown in Table 1 and processed as shown in the Examples.

TABLE 1

| Formulation @ 3.0-3.5% Protein, 1.0-1.5% Fat Content | % by wt. |
|---|---|
| Sugar | 7.500 |
| Cocoa Powder | 0.700 |
| Stabilizer | 0.20 |
| Fresh Milk, 1.0% Fat | Add to 100 |

All dry powders (stabilizer and cocoa powder) were dry-blended together with sugar and mixed for approximately 30 minutes in fresh milk using a medium shear propeller mixer (e.g. type Heidolph RZR 2020 or equivalent). The milk solution was heated to 85° C. and pasteurized for 15 s. The milk was then passed through Niro Soavi homogenizer (or equivalent) with a two-stage pressure of 150-200 bar. After homogenization, the product was cooled to 20-25° C. and filled into sterile bottles.

Beverage performance was measured by visual observation parameters as described in Table 2 below.

TABLE 2

| Visual Parameters | Explanation | Method of measurement | Standard Scale to be used |
|---|---|---|---|
| On a 125 ml bottle before any manipulation | | | |
| Creaming | Fat separation at the Top of the Liquid | Height of fat separation measured in terms of millimeters (mm). | Minimum (acceptable) |
| Serum separation | Visual Transparent Layer at the Top of the Liquid | Height of separation measured in terms of millimeters (mm). | Minimum (acceptable) |
| Marbling | Clear Layers of whey inside the product (waves) | NIL | Greater than strong marbling not acceptable |
| Sedimentation Layer | Particles Layer at the Bottom of the Liquid | Height of sedimentation layer measured in millimeters (mm). | Greater than Loose sedimentation not acceptable |
| In a 125 ml bottle during and after pouring | | | |
| Flow Properties | During pouring, evaluate the level of rippling until gelled pieces are visible | NIL | Greater than Slight rippling not acceptable |

TABLE 3

| | | Example | | | | | | | |
|---|---|---|---|---|---|---|---|---|---|
| | | 1 | 2 | 3 | 4 | 5 | 6 | 7 | Current invention |
| Composition | | 6% L/ 6% M | 8% M | 6% L/ 6% M | 10% M | 6% L/ 6% L | 6% M | 6% M | 5% L/ 5% M |
| Low DS CMC | DS | 0.79 | | 0.79 | | 0.79 | | | 0.78 |
| | 2% viscosity | 41 | | 41 | | 41 | | | 77 |
| Low DS CMC | DS | | | | | 0.71 | | | |
| | 2% viscosity | | | | | 770 | | | |
| Medium DS CMC | DS | 0.85 | 0.88 | 0.92 | 0.85 | | 0.92 | 0.91 | 0.91 |
| | 2% viscosity | 475 | 440 | 1980 | 475 | | 1980 | 670 | 670 |
| Readco extrusion | | ++ | + | o | o | ++ | o | ++ | ++ |
| Initial viscosity (spindle #) | | 3600 (#3) | 5200 (#4) | 530 (#2) | 230 (#1) | 2600 (#3) | 560 (#2) | 1460 (#2) | 2955 (#3) |
| Set-up viscosity (spindle #) | | 7000 (#4) | 6170 (#4) | 2425 (#3) | 1620 (#2) | 5400 (#4) | 1500 (#3) | 2225 (#3) | 5300 (#4) |
| G' | | 88.9 | 92.3 | 4.9 | — | 42.5 | 4 | — | 57.9 |
| Thixotropy | | 631.5 | 323.2 | 215 | — | 726.4 | 168.9 | — | 506.6 |
| HSTS milk evaluation | | Pass all criteria | Fail by sedimentation | — | — | Fail by sedimentation | — | — | Pass all criteria | where, ++ good (strong) attrition, + some (weak) attrition, o poor or no attrition.
Unit of viscosity is cP, unit of G' is Pa, unit of thixotropy is Pa/s.

Example 9

Current invention materials were made at a plant scale as following:

MCC wetcake with total solids content in the range of about 38% to about 43%;

This wetcake is moved by three screw conveyors to a feeder through a chute to the extruder system;

In parallel a dry blend of Low DS CMC (DS=0.78 and viscosity=77 cP) and medium DS CMC (DS=0.91 and viscosity=670 cP) is fed to a Loss in Weight (LIW) feeder that charges the CMCs at a designated rate to the extruder system through the same chute as the MCC;

The rate of addition of the 2 feeder systems is controlled to provide a ratio of CMC in the MCC in the range of 8% to 10% wt.;

The extruder system is used to blend the CMC with the MCC wetcake and to attrit the mixture; and, the wetcake is forced through a plate at the end of the extrusion process;

The resulting wet cake drops into a mix tank, and purified water is added to help disperse the wet cake to form a slurry.

The slurry is pumped to a spray dryer for drying and particle sizing. The spray dryer has a 40' drying chamber and uses a rotating disc to atomize the slurry; and, The resultant powder is screened and packaged.

The resulting stabilizer was evaluated in the following test formulations:

1. Low Solids Water Model System

Samples of a Low solids water food stabilizer model system were prepared according to the following formulation as shown in Table 4.

TABLE 4

| Formulation @ <1% Total Solids Level | % by wt |
|---|---|
| Titanium Dioxide | 0.500 |
| Contrasting Agent | 0.025 |
| Stabilizer (Avicel ® brand control or invention samples) | 0.30 and 0.45 |
| De-ionized Water | Add to 100 |

Process:

All powders (Titanium Dioxide and Colloidal MCC) were dry blended together and mixed for approximately 10 mins in the de-ionized water using a high shear mixer (e.g. type Silverson or equivalent). A contrasting agent was then added and further mixed for approximately another 5 mins. The product was then passed through a Niro Soavi homogenizer with a two-stage pressure of 150-200 bar and filled into 100 mL autoclavable bottles. The product was then sterilized for 1 minute in an Autoclave machine (e.g. type Hirayama HiClave HV-50 or equivalent). Finally, the mixture was cooled to 25° C. in an ice bath.

Low solids water model system performance was measured by visual observation parameters such as the height of water phase and compactness of sedimentation of insoluble Titanium Dioxide, as well as the flow properties, as described in Table 5. Measurements were made on Days 0, 3, 7 and 14 at 25° C.

TABLE 5

| Visual Parameters | Explanation | Method of measurement | Standard Scale to be used |
|---|---|---|---|
| On a 100 ml bottle before any manipulation | | | |
| Clear Top Separation | Visual Transparent Layer at the Top of the Liquid | Height of separation measured in terms of millimeters (mm). | Greater than 7 mm (not acceptable). |
| Sedimentation Layer | Particles Layer at the Bottom of the Liquid | Height of sedimentation layer measured in millimeters (mm). | Slightly compact and compact sedimentation not acceptable. |
| In a 100 ml bottle during and after pouring | | | |
| Flow Properties | During pouring, evaluate the level of rippling until gelled pieces are visible | NIL | Greater than slight rippling (not acceptable) |

2. UHT Dairy Chocolate Milk Beverages

Samples of a UHT Dairy Chocolate Milk beverage were prepared using the formulation as shown in Table 6 below.

TABLE 6

| Formulation @ 2.5-3.0% Protein, 3.0-3.5% Fat Content | % By wt. |
|---|---|
| Whole Milk Powder (WMP) | 11.500 |
| Sugar | 5.000 |
| Cocoa Powder | 0.700 |
| Stabilizer (Avicel ® brand control or invention samples) | 0.15 and 0.20 |
| Water | Add to 100 |

Process:

WMP was hydrated for approximately 20 minutes in pre-heated water mixture of approximately 45-55° C. using a medium shear propeller mixer (e.g. type Heidolph RZR 2020 or equivalent). All dry powders (stabilizer and cocoa powder) were dry-blended together with sugar and mixed for approximately 10-15 minutes in the milk solution using a medium shear propeller mixer (e.g. type Heidolph RZR 2020 or equivalent). The chocolate milk solution was then heated to above 70° C.

The heated chocolate milk solution was passed through Niro Soavi homogenizer with a two-stage pressure of 150-200 bar. After homogenization, the product was first pre-heated to 90° C. and then sterilized at 137° C. for 10 s in a UHT line (e.g. type Powerpoint International or equivalent). The product was then cooled to less than 40° C. in the first stage cooling, followed by further cooling to 20-25° C. in the second stage cooling and aseptically filled into sterile bottles.

Beverage performance was measured by visual observation parameters as described in Table 7 below.

TABLE 7

| Visual Parameters | Explanation | Method of measurement | Standard Scale to be used |
|---|---|---|---|
| On a 125 ml bottle before any manipulation | | | |
| Creaming | Fat separation at the Top of the Liquid | Height of fat separation measured in terms of millimeters (mm). | Minimum (acceptable) |
| Serum separation | Visual Transparent Layer at the Top of the Liquid | Height of separation measured in terms of millimeters (mm). | Minimum (acceptable) |
| Marbling | Clear Layers of whey inside the product (waves) | NIL | Greater than strong marbling not acceptable |
| Sedimentation Layer | Particles Layer at the Bottom of the Liquid | Height of sedimentation layer measured in millimeters (mm). | Greater than Loose sedimentation not acceptable |
| In a 125 ml bottle during and after pouring | | | |
| Flow Properties | During pouring, evaluate the level of rippling until gelled pieces are visible | NIL | Greater than Slight rippling not acceptable |

3. UHT Daily High Calcium Milk Beverages

Samples of a UHT Dairy High Calcium Milk beverage were prepared using the formulation as shown in Table 8 below.

TABLE 8

| Formulation @ 2.5-3.0% Protein, 2.5-3.0% Fat Content | % by wt. |
|---|---|
| Pasteurized Milk | 52.000 |
| Whole Milk Powder (WMP) | 5.000 |
| Sugar | 2.000 |
| TriCalcium Phosphate (TCP) | 0.140 |
| Mouth feel enhancer | 0.0120 |
| Stabilizer (Avicel ® brand control or invention samples) | 0.10 |
| Water | Add to 100 |

Process:

Pasteurized milk was heated to 45-55° C. and remaining hot water was added to the heated milk. WMP was then added into heated milk mixture and hydrated for approximately 20 minutes using a medium shear propeller mixer (e.g. type Heidolph RZR 2020 or equivalent). All dry powders (stabilizer and mouth feel enhancer) were dry-blended together with sugar and mixed for approximately 10-15 minutes in the milk solution using a medium shear propeller mixer (e.g. type Heidolph RZR 2020 or equivalent). TCP was lastly added and mixed in the milk solution for approximately 5-10 minutes.

The milk solution was heated to above 70° C. and passed through Niro Soavi homogenizer with a two-stage pressure of 150-200 bar. After homogenization, the product was first pre-heated to 90° C. and then sterilized at 137° C. for 10 s in a UHT line (e.g. type Powerpoint International or equivalent). The product was then cooled to less than 40° C. in the first stage cooling, followed by further cooling to 20-25° C. in the second stage cooling and aseptically filled into sterile bottles.

Beverage performance was measured by visual observation parameters as described in Table 9 below.

TABLE 9

| Visual Parameters | Explanation | Method of measurement | Standard Scale to be used |
|---|---|---|---|
| On a 125 ml bottle before any manipulation | | | |
| Creaming | Fat separation at the Top of the Liquid | Height of fat separation measured in terms of millimeters (mm). | Minimum (acceptable) |
| Serum separation | Visual Transparent Layer at the Top of the Liquid | Height of separation measured in terms of millimeters (mm). | Minimum (acceptable) |
| Marbling | Clear Layers of whey inside the product (waves) | NIL | Greater than strong marbling not acceptable |
| Sedimentation Layer | Particles Layer at the Bottom of the Liquid | Height of sedimentation layer measured in millimeters (mm). | Greater than Loose sedimentation not acceptable |
| In a 125 ml bottle during and after pouring | | | |
| Flow Properties | During pouring, evaluate the level of rippling until gelled pieces are visible | NIL | Greater than Slight rippling not acceptable |

Four products were tested and a comparison with current disclosed composition.

Avicel® CL 611 brand from FMC Corporation, Philadelphia, USA

Avicel® RC 591F brand from FMC Corporation, Philadelphia, USA

Avicel® XP 3624 brand from FMC Corporation, Philadelphia, USA

Product J from US 2013/0064953 and US 2014/0212563 with CMCs at DS=0.60-0.90 and DS=1.10-1.45

Example 10 Low Solids Water System (Test System 1)

| Colloidal MCC Samples | Set-up Viscosity at 2.6% solids | Low Dosage | | High Dosage | |
|---|---|---|---|---|---|
| | | Dose | Food Results | Dose | Food Results |
| Avicel® RC 591F brand | 7000 cps | 0.30% | Fail by sedimentation | 0.45% | Fail by sedimentation |
| Product J | 5600 cps | 0.30% | Pass all criteria | 0.45% | Fail by gelation |
| Current invention | 5300 cps | 0.30% | Pass all criteria | 0.45% | Pass all criteria |

Example 11 UHT Dairy Chocolate Milk (Test System 2)

| Colloidal MCC Samples | Set-up Viscosity at 2.6% solids | Low Dosage | | High Dosage | |
|---|---|---|---|---|---|
| | | Dose | Food Results | Dose | Food Results |
| Avicel® 591F brand | 7000 cps | 0.15% | Fail by sedimentation | 0.20% | Fail by sedimentation |
| Product J | 5600 cps | 0.15% | Fail by sedimentation | 0.20% | Fail by gelation |
| Current invention | 5300 cps | 0.15% | Pass all criteria | 0.20% | Pass all criteria |

Example 12 UHT Dairy High Calcium Milk (Test System 3)

| Colloidal MCC Samples | Set-up Viscosity at 2.6% solids | Dairy Milk Test | |
|---|---|---|---|
| | | Dose | Food Results |
| Avicel ® RC 591F brand | 7000 cps | 0.10% | Fail by sedimentation |
| Current invention | 5300 cps | 0.10% | Pass all criteria |

Example 13 Low Solids Water System (Test System 1)

| Colloidal MCC Samples | Set-up Viscosity at 2.6% solids | Low Dosage | | High Dosage | |
|---|---|---|---|---|---|
| | | Dose | Food Results | Dose | Food Results |
| Avicel ® CL 611 brand | 2000 cps | 0.30% | Fail by sedimentation | 0.45% | Fail by sedimentation |
| Current invention | 5300 cps | 0.30% | Pass all criteria | 0.45% | Pass all criteria |

Example 14 UHT Dairy Chocolate Milk (Test System 2)

| Colloidal MCC Samples | Set-up Viscosity at 2.6% solids | Low Dosage | | High Dosage | |
|---|---|---|---|---|---|
| | | Dose | Food Results | Dose | Food Results |
| Avicel ® CL 611 brand | 2000 cps | 0.15% | Fail by sedimentation | 0.20% | Fail by sedimentation |
| Current invention | 5300 cps | 0.15% | Pass all criteria | 0.20% | Pass all criteria |

Example 15 Low Solids Water System (Test System 1)

| Colloidal MCC Samples | Set-up Viscosity at 2.6% solids | Low Dosage | | High Dosage | |
|---|---|---|---|---|---|
| | | Dose | Food Results | Dose | Food Results |
| Avicel ® XP 3624 brand | 3500 cps | 0.30% | Fail by sedimentation | 0.45% | Pass all criteria |
| Current invention | 5300 cps | 0.30% | Pass all criteria | 0.45% | Pass all criteria |

Example 16 UHT Dairy Chocolate Milk (Test System 2)

| Colloidal MCC Samples | Set-up Viscosity at 2.6% solids | Low Dosage | | High Dosage | |
|---|---|---|---|---|---|
| | | Dose | Food Results | Dose | Food Results |
| Avicel ® XP 3624 brand | 3500 cps | 0.15% | Fail by sedimentation | 0.20% | Pass all criteria |
| Current invention | 5300 cps | 0.15% | Pass all criteria | 0.20% | Pass all criteria |

It is to be appreciated that certain features of the invention, which are, for clarity, described above in the context of separate embodiments, may also be provided in combination in a single embodiment. Conversely, various features of the invention that may also be provide separately or in any sub-combination. Further, reference to values stated in ranges included each and every value within that range.

The invention claimed is:

1. A colloidal MCC stabilizer, comprising:
   i) hydrolyzed colloidal microcrystalline cellulose;
   ii) low DS carboxymethyl cellulose having a viscosity of 30-85 cP in 2% deionized water, measured with a Brookfield RV viscometer at room temperature and 60 rpm, and a DS of about 0.60 to about 0.85; and,
   iii) medium DS carboxymethyl cellulose having a viscosity of 400-800 cP in 2% deionized water, measured with a Brookfield RV viscometer at room temperature and 30 rpm, and a DS of about 0.80 to about 0.95, wherein the weight ratio of microcrystalline cellulose/low DS carboxymethyl cellulose/medium DS carboxymethyl cellulose is in the range of from about 92/4/4 to about 88/6/6.

2. The colloidal MCC stabilizer of claim 1, wherein the weight ratio of microcrystalline cellulose/low DS carboxymethyl cellulose / medium DS carboxymethyl cellulose is selected from the group consisting of 92/4/4, 90/5/5, and 88/6/6.

3. The colloidal MCC stabilizer of claim 1, wherein the weight ratio of microcrystalline cellulose/low DS carboxymethyl cellulose/medium DS carboxymethyl cellulose is 88/6/6.

4. The colloidal MCC stabilizer of claim 1, wherein the carboxymethyl cellulose are in sodium, ammonia or potassium salt form.

5. The colloidal MCC stabilizer of claim 1, wherein the low and medium DS carboxymethyl cellulose are in sodium salt form.

6. The colloidal MCC stabilizer of claim 1, wherein the medium DS carboxymethyl cellulose is not more than 8% wt. of the stabilizer.

7. The colloidal MCC stabilizer of claim 1, wherein the weight ratio of the microcrystalline cellulose to the sum of the low and medium DS carboxymethyl celluloses is from about 88:12 to 92:8.

8. A beverage product comprising the stabilizer of claim 1.

9. A beverage product of claim 8, selected from the group consisting of chocolate dairy milk beverage containing cocoa; almond beverage containing finely ground almond; fortified calcium milk containing insoluble calcium salts; and chocolate soy beverage containing cocoa.

10. A beverage product of claim 8 comprising dairy milk, wherein the milk is selected from the group consisting of: Pasteurized milk; Retort milk; UHT milk; Full Cream milk; Hi-Calcium milk, Low Fat milk; Strawberry-flavored milk; and Chocolate-flavored milk.

11. A beverage product of claim 8 wherein the beverage product is a plant protein beverage comprising at least one milk selected from the group consisting of: Almond milk; Soy milk; Peanut milk; Coconut milk; and Walnut milk.

12. The colloidal MCC stabilizer of claim 1, wherein the low DS CMC and medium DS CMC comprise 8 to 12% wt. of the stabilizer.

13. The beverage product of claim 8, wherein the stabilizer comprises 0.05% wt. to 3.5% wt. of total product.

14. The beverage product of claim 8, wherein the stabilizer comprises 0.2 to 2.0% by weight of total product.

15. A method for preparing a stabilizer, comprising the steps of:
i) preparing a moist wetcake of hydrolyzed colloidal microcrystalline cellulose comprised of crystallites;
ii) preparing a dry blend of low DS carboxymethyl cellulose having a viscosity of 30-85 cP in 2% deionized water, measured with a Brookfield RV viscometer at room temperature and 60 rpm, and a DS of about 0.60 to about 0.85, with a medium DS carboxymethyl cellulose having a viscosity of 400-800 cP in 2% deionized water, measured with a Brookfield RV viscometer at room temperature and 30 rpm, and a DS of about 0.80 to about 0.95;
iii) blending the wetcake i) with the dry blend ii); and
iv) co-attriting the blend iii),
wherein the weight ratio of microcrystalline cellulose/ low DS carboxymethyl cellulose/medium DS carboxymethyl cellulose is in the range of from about 92/4/4 to about 88/6/6.

16. The method of claim 15, further comprising: the step of spray drying the co-attrited blend iv) to form a powder.

17. The method of claim 15, wherein the wetcake comprises about 38-60% wt. water.

18. The method of claim 15 wherein the co-attrition step iii) is performed in an extruder, refiner, planetary mixer, colloidal mill, beat mill, kneader, or grinder.

* * * * *